(12) United States Patent
Grollitsch

(10) Patent No.: US 8,221,048 B2
(45) Date of Patent: Jul. 17, 2012

(54) LIFTING APPARATUS FOR USE IN A TRUCK BED

(76) Inventor: Helmut Grollitsch, Houston, TX (US)

( * ) Notice: Subject to any disclaimer, the term of this patent is extended or adjusted under 35 U.S.C. 154(b) by 207 days.

(21) Appl. No.: 12/763,314

(22) Filed: Apr. 20, 2010

(65) Prior Publication Data
US 2011/0255944 A1 Oct. 20, 2011

(51) Int. Cl.
B60P 1/00 (2006.01)
B60P 1/48 (2006.01)

(52) U.S. Cl. .......................... 414/546; 414/462

(58) Field of Classification Search .................. 414/462, 414/546, 486
See application file for complete search history.

(56) References Cited

U.S. PATENT DOCUMENTS

| | | | | |
|---|---|---|---|---|
| 3,239,080 A | * | 3/1966 | Corompt | 414/541 |
| 3,622,026 A | * | 11/1971 | Tornheim | 414/486 |
| 3,637,097 A | | 1/1972 | Horowitz | |
| 3,700,123 A | | 10/1972 | Corley, Jr. | |
| 3,913,759 A | * | 10/1975 | Deacon | 414/546 |
| 4,265,585 A | | 5/1981 | Hawkins | |
| 4,509,894 A | * | 4/1985 | Rolfe | 414/555 |
| 4,671,729 A | * | 6/1987 | McFarland | 414/462 |
| 5,119,961 A | | 6/1992 | Runn | |
| 5,405,234 A | * | 4/1995 | Ziaylek et al. | 414/462 |
| 5,641,262 A | | 6/1997 | Dunlop et al. | |
| 6,019,567 A | | 2/2000 | Lutkus et al. | |
| 6,152,674 A | * | 11/2000 | Ogrodnick | 414/498 |
| 6,234,741 B1 | | 5/2001 | McDaniel | |
| 6,457,931 B1 | * | 10/2002 | Chapman | 414/491 |
| 6,799,935 B1 | | 10/2004 | Grollitsch | |
| 7,232,285 B1 | * | 6/2007 | Ruch | 414/542 |
| 8,061,955 B2 | * | 11/2011 | McIntosh | 414/546 |

* cited by examiner

*Primary Examiner* — James Keenan
(74) *Attorney, Agent, or Firm* — Egbert Law Offices PLLC

(57) ABSTRACT

A lifting apparatus has a support structure, a frame pivotally connected to the support structure, an actuator connected to the frame so as to move the frame between a retracted position and an extended position, a lifting bar pivotally connected to the frame, and a linkage having one end pivotally connected to the support structure and an opposite end connected to the lifting bar. The lifting bar has a first strut with one end pivotally connected to the frame, a second strut with the one end pivotally affixed to the frame, and a cross member affixed adjacent to opposite ends of the first and second struts and extending thereacross. The linkage includes a first link and a second link.

14 Claims, 4 Drawing Sheets

LIFTING APPARATUS FOR USE IN A TRUCK BED

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to lifting devices as used in trucks. More particularly, the present invention relates to apparatus whereby heavy loads can be moved from a location outside of the bed of a truck into the interior of the truck bed and, in particular, in a desired location within the bed of the truck.

2. Description of Related Art Including Information Disclosed Under 37 CFR 1.97 and 37 CFR 1.98

For many years, the advantages of providing a cargo-carrying vehicle such as a truck with a lift gate have been recognized. As is well known, lift gates are gates which not only close the rear of the bed of the vehicle, but which, when in the housing position, may be moved between a first position wherein they are an extension of the truck bed and a second position resting on the underlying terrain. Cargo may be loaded on or removed from the gate while in the latter position or loaded into or unloaded from the vehicle when in the former position. Conventionally, some sort of motor is utilized to drive the lift gate between the two positions. There is some sort of linkage which maintains the upper surface of the gate in a generally horizontal plane during such movement to prevent cargo on the gate from falling off.

Lift gates are generally not suited for small or medium sized cargo-carrying vehicles because the linkage and the drive system for moving the gate between upper and lowered positions was adapted to be located wholly below the plane of the truck bed. This, in turn, requires that the bed of the truck be located relatively high above the underlying terrain to provide the requisite ground clearance. As a result, this is limited to relatively large cargo-carrying vehicles with high road clearances.

Another problem with lift gates is that the cargo is only brought to the very end of the bed of the truck. As a result, it is still necessary to move the heavy load from the lift gate into the bed of the truck. Such movement of heavy loads can be inconvenient and difficult to accomplish. In other circumstances, the heavy load must be lifted a small distance so as to bring the load into proximity onto the lift gate. Once again, workers must be prepared to lift the load, at least a small distance, so as to place the load in its desired position on the lift gate. In many circumstances, the heavy load is only delivered to the very back of the bed of the truck. As a result, the truck will have an unbalanced load heavily oriented toward the rear of the truck. Such unbalanced loads can create driving hazards. Additionally, and furthermore, the lift gates only allow the load to be delivered toward the rear of the bed of the truck. When additional heavy loads must be introduced into the bed, there is often a lack of space for such loads since the initial loads have not been moved toward the forward end of the bed.

In other circumstances, cranes have been proposed for use on such truck beds. Unfortunately, these cranes are often unwieldy devices which prevent the load from being adequately delivered into the interior of the vehicle. In certain circumstances, the cranes will present a structure which extends outwardly above the top of the truck body. As a result, damage can often occur during the movement of the truck with these outwardly extending projections. Additionally, and furthermore, these cranes also fail to deliver the load where it is best desired, i.e. toward the forward end of the bed. These rear-mounted cranes often lift the load to a position whereby the worker can push the load into the rear portion of the pickup truck bed. Once again, limited loads and unevenly distributed loads will result.

In the past, various patents have issued in the past for the loading of the bed of trucks. U.S. Pat. No. 3,637,097, issued on Jan. 25, 1972 to R. R. Horowitz, describes a power-operated tailgate. This power-operated tailgate mechanism has pairs of bell-crank lever arms pivotally mounted on the bed surface and outer ends pivotally connected to a support arm which is attached to the tailgate. The relationship of the pivotal connections is such as to provide a parallelogram linkage for the purpose of maintaining the tailgate surface in a load-carrying attitude during the elevating and lowering movement of the tailgate.

U.S. Pat. No. 3,700,123, issued on Oct. 24, 1972 to Q. D. Corley, Jr., describes a lift frame for attachment to the truck bed. This lift frame includes a tubular horizontal base having integral transverse brackets for attachment to the truck frame and having upright end posts securely welded to the tubular member. A hinged lift platform is provided which is swingably supported by parallelogram arms on the frame end posts. A torque bar connects the lift arms. A hydraulic power cylinder connects one lift arm and one corner post to swing the lift platform between the upper position in the plane of the truck bed and a lower ground position.

U.S. Pat. No. 4,265,585, issued on May 5, 1981 to W. H. Hawkins, teaches a loading device for vehicle beds wherein transversely aligned boom members have an extensible inverted U-shaped member adjustably carried on free ends thereof. The U-shaped member is pivotally secured on a supporting frame and operated by fluid-operated cylinder assemblies which are pivotally connected on one end to a respective boom and on the other end to an upright frame member carried forwardly in the vehicle. The cylinder assemblies ascend above the top of the bed of the pickup truck so that the U-shaped member will rest in a stowed position above the truck bed.

U.S. Pat. No. 5,119,961, issued on Jun. 9, 1992 to L. E. Runn, describes a removable, truck-mounted crane with both an inclined boom for high lift and a horizontal telescoping boom for extended reach beyond the truck. The crane has two winches which can be routed to either boom. A rolling storage stand with winches is used to support the truck tailgate while enabling one person to install or remove the crane from the truck.

U.S. Pat. No. 5,641,262, issued on Jun. 24, 1997 to Dunlop et al., describes a hydraulic lift apparatus whereby the tailgate of the pickup truck can be moved from a lowered position to an upper position.

U.S. Pat. No. 6,019,567, issued on Feb. 1, 2000 to Lutkas et al., describes a slidable load lifting system which can be retracted into the pickup truck. This load lifting apparatus includes a base frame member attached to the truck bed. This base frame member supports a substantially planar roller platform member slidably therein. A pair of elongate rail members extends in parallel and is adapted to engage a set of roller wheels provided on the bottom of the roller platform member. A substantially planar lift platform member is operatively connected to the other roller platform member through a set of parallelogram linkages which allow the lift platform to be moved between a raised position coplanar with the roller platform and a lowered position out of the plane of the roller member for convenient loading of the lift platform at ground level.

U.S. Pat. No. 6,234,741, issued on May 22, 2001 to S. P. McDaniel, describes a forklift for pickup truck. This forklift device is adapted to be installed within the bed of a conventional pickup truck. The horizontal movement of the fork is provided by movement of the truck. When the device is not in use, it is disposed above the forward portion of the truck bed.

Referring to FIG. 1, there is shown prior art the lifting apparatus 10. The lifting apparatus 10 includes a truck 12, a lifting bar 14 and a cylinder assembly 16. Cylinder assembly 16 is connected to the lifting bar 14 through linkage 18. The truck 12 has a bed 20 with a first side wall 22 and a second side wall 24. The bed 20 also has an end opening 26 with a tailgate 28 pivotally attached thereto. The tailgate 28 is pivotable so as to open and close the end opening 26. In one position, the tailgate 28 will be in planar relationship with the bed 20. In the closed position, the tailgate 28 will be upright so as to be transverse to the bed 20. The truck 12 also has a forward wall 30 at an end of the bed 20 opposite the end opening 26. The truck 12, as in the nature of pickup trucks, has a passenger compartment 32 forward of the wall 30.

As can be seen in FIG. 1, the lifting arm 14 has a first side 34 and a second side 36 in parallel relationship to the first side. A crossbar 38 extends between the ends of the sides. The lifting arm 14 has a generally inverted U-shaped configuration. The ends of the sides 34 and 36 opposite the crossbar 38 are pivotally connected at 40 to the side walls of the truck 12. Suitable structures can be employed so as to allow the pivotal movement at 40 to occur without damage to the side walls 22 and 24. A lifting line 42 is affixed to the crossbar 38 generally between the sides. The lifting line 42 is connected to a load 48 such that the load 48 can move upwardly and inwardly relative to the 180 degree range of motion of the lifting arm 14.

With reference to FIG. 1, when it is desired to place the lifting bar 14 in a position for lifting the load 48, a controller (in the passenger compartment 32 or on a side wall of the bed 20) can be actuated so that the cylinder assembly 16 will cause the lifting bar 14 to be moved outwardly of the end opening 26 of the bed 20. When the crossbar 38 is approximately above the load 48, the lifting line 42 can be connected to the load 48. The cylinder assembly 16 can be actuated so that the lifting bar 14 is pivoted about pivot point 40 so as to move the load 48 from the position shown in FIG. 1 to a position within the bed 20. When the crossbar 38 is in a proper position above the bed 20, the lifting line 42 can be released so that the load 48 is in its desired position in the bed 20.

Strong support lines 42 can extend downwardly from the crossbar 38. The pivotal movement of the lifting arm 14 will allow the load 48 to be moved to a desired position within the bed 20. The load 48 can then be released from the lines so as to be placed in a desired position within the bed 20. This allows the load 48 to be placed in any desired location within the bed 20. As such, if multiple loads 48 must be placed within the bed 20, they can be first moved toward the forward wall 30 and then placed in position sequentially thereafter toward the end opening 26. After the load has been placed within the bed 20, the tailgate 26 can be raised upright so that the truck 12 can move to a desired location.

So as to overcome the problems associated with the prior art, the present inventor developed a technology associated with U.S. Pat. No. 6,799,935, issued on Oct. 5, 2004. This patent is illustrated in FIG. 1 herein.

One of the problems associated with the lifting apparatus U.S. Pat. No. 6,799,935 is that there is insufficient clearance between the tailgate 28 of the bed 26 of the truck 12. Ultimately, the fully extended position of the crossbar 38 will be the centerline of objects that are desired to be picked up and placed within the bed of the truck. Under certain circumstances, the load that is to be lifted would not have sufficient clearance so as to be lifted over the tailgate 28 or over the edge of the bed 26 of the truck 12.

There have been significant developments related to remote controlled vehicles for use in military applications. In certain of these applications, military personnel or equipment are delivered by the remote controlled vehicle to a desired location in the field. As such, a suitably large container is placed onto the bed of the truck for delivery. After the container is delivered, the remote-controlled vehicle can be returned to the location of the load for pick up and retrieval. As such, where such large containers are used on such remote controlled vehicles, it is important to provide a lifting mechanism whereby the large container is effectively lifted and returned to the bed of the vehicle.

It is an object of the present invention to provide a lifting apparatus for use in a truck which allows loads to be delivered into the bed of the truck.

It is another object of the present invention to provide a lifting apparatus which allows heavy loads to be placed in any desired position within the bed of the truck.

It is another object of the present invention to provide a lifting apparatus which avoids the use of power-operated tailgates.

It is another object of the present invention to provide a lifting apparatus which can be stowed entirely within the interior of the bed of the truck.

It is still a further object of the present invention to provide a lifting apparatus which entirely avoids the need for human lifting activity.

It is still another object of the present invention to provide a lifting apparatus which provides an entire 180 degree range of motion of the lifting arm relative to its pivot point within the bed of the truck.

It is still another object of the present invention to provide a lifting apparatus which is easy to use, relatively inexpensive, easy to install and simple to manufacture.

It is still a further objected of the present invention to provide a lifting apparatus that allows for relatively large loads to be effectively lifted and to clear the edge of the truck bed or the edge of the tailgate.

It is still a further object of the present invention to provide a lifting apparatus that allows for maximum distance to be achieved between a centerline of the load and the back edge of the vehicle.

These and other objects and advantages of the present invention will become apparent from a reading of the attached specification and appended claims.

BRIEF SUMMARY OF THE INVENTION

The present invention is a lifting apparatus that comprises a support structure, a frame pivotally connected to the support structure, an actuating means connected to the frame so as to move the frame between a retracted position and an extended position, a lifting bar pivotally connected to the frame, and a linkage having one end pivotally connected to the support structure and an opposite end connected to the lifting bar.

In the present invention, the support structure comprises a beam, and a flange affixed to the beam and extending upwardly therefrom. The frame is pivotally connected to the beam. The lifting bar is pivotally connected to the flange. The support structure also includes a truck bed having the bean affixed thereto.

In the present invention, the frame comprises a first arm that is pivotally affixed at one end to the support structure, a second arm that is pivotally affixed at one end to the support structure, and a cross bar extending between the first and second arms of the respective opposite ends thereof.

The lifting bar is pivotally affixed to the first arm and the second arm at a position between the ends thereof. The lifting bar includes a first strut having one end pivotally affixed to the frame, a second strut having one end pivotally affixed to the frame, and a cross member affixed adjacent to opposite ends of the first and second struts and extending thereacross. The first strut and the second strut and the cross member define a generally U-shaped configuration.

The linkage of the present invention includes a first link that has one end pivotally affixed to the support structure and an opposite end pivotally affixed to the first strut in a position between the ends thereof. The linkage also includes a second link having one end pivotally affixed to the support structure and an opposite end pivotally affixed to the second strut in a position between the ends thereof. Each of the first and second links has a fixed length. The pivotal connection of the linkage with the support structure is elevated above the pivotal connection of the frame with the support structure.

In the present invention, "actuating means" will, preferably, be a hydraulic piston-and-cylinder assembly. Alternatively, the "actuating means" can include various other mechanical systems such as a pneumatic piston-and-cylinder assembly, a motor assembly, a suitable transmission connected to the motor assembly, and related mechanisms.

DETAILED DESCRIPTION OF THE INVENTION

Figure 1:
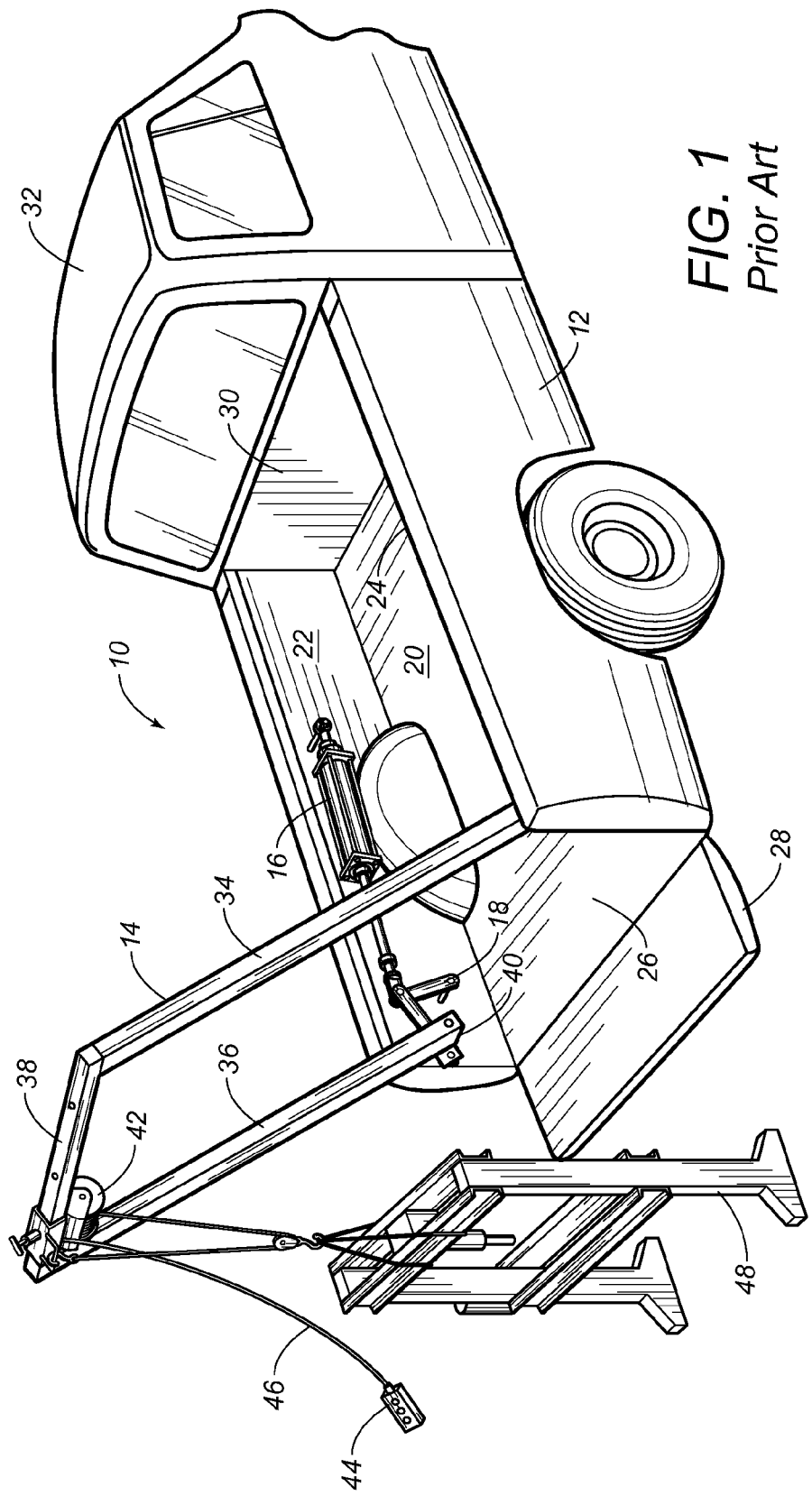
FIG. 1 is a perspective view of a lifting apparatus of prior art.
Figure 2:
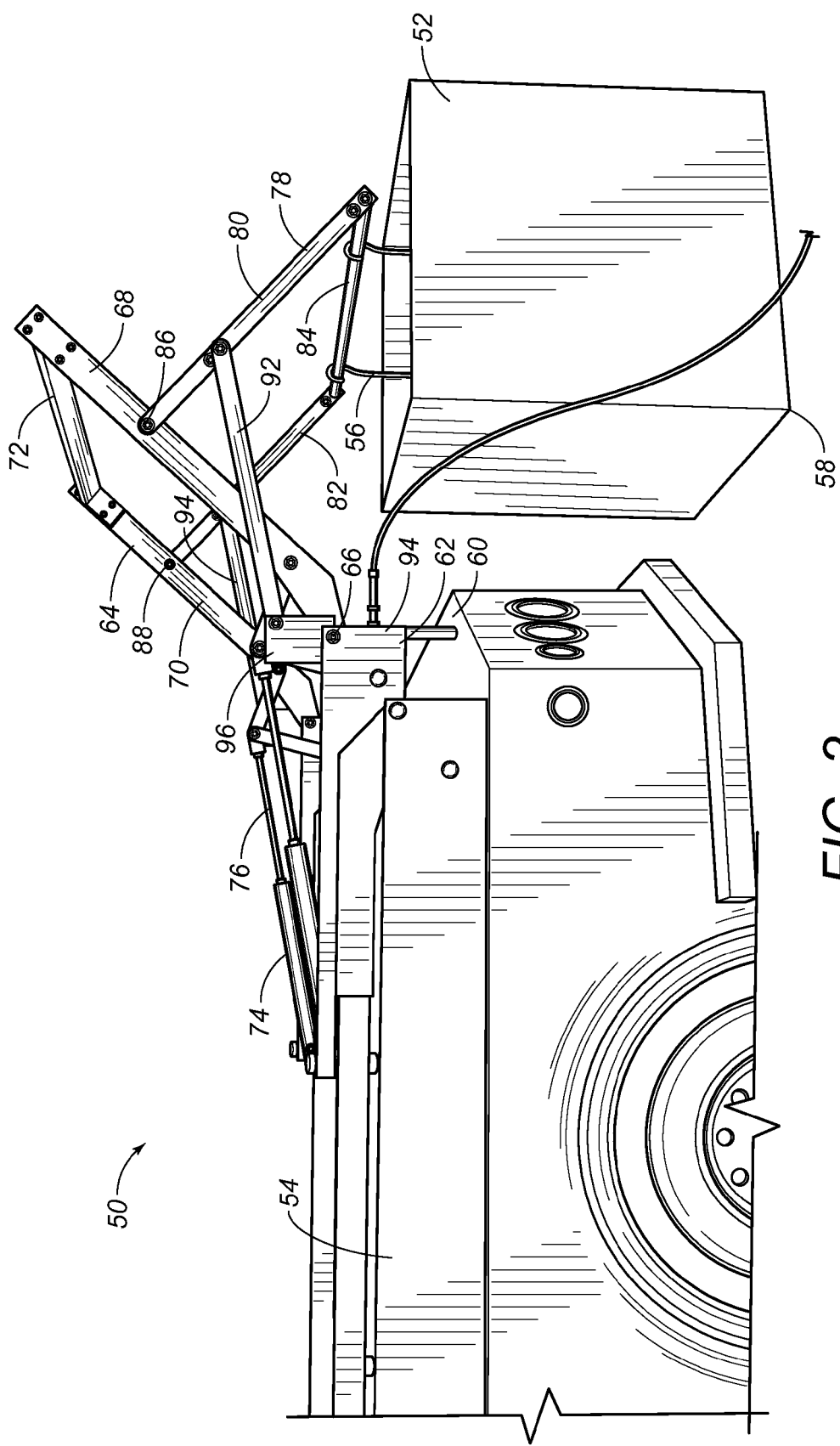
FIG. 2 is a perspective view showing the lifting apparatus of the present invention in a suitable position for lifting a load from the ground.

Referring to FIG. 2, there is shown the lifting apparatus 50 in accordance with the teachings of the present invention. The lifting apparatus 50 utilizes a "scissor-lift" mechanism similar to the mechanism used for pivoting the lifting bar of FIG. 1. The lifting apparatus 50 includes an extension lifting bar assembly which enhances the ability of the lifting apparatus 50 to lift a large sized load 52 for the purposes of placing the load 52 onto the bed of a truck 54. In particular, the load 52 is illustrated as a relatively large box having connectors 56 extending therefrom. The load 52 can be utilized for the deployment of personnel and equipment by a remote controlled vehicle, such as a truck 54. It can be seen that the load 52 has a relatively large configuration. As such, it is important to be able to elevate the bottom corner 58 of the load 52 to an elevation suitable for clearing the back edge 60 of the bed of the truck 54. As such, the lifting apparatus 50 of the present invention is able to accommodate the relatively large cubical shape of the load 52 for the purposes of allowing the load 52 to be placed easily, conveniently and by remote-control onto the bed of the truck 54.

The lifting apparatus 50 includes a support structure 62. The support structure 62 is properly secured, by welding, bolting, or by other means, onto the bed of the truck 54. As such, the support structure 62 provides a strong base upon which to place the lifting components of the lifting apparatus 50.

A frame 64 is pivotally connected to the support structure 62. In particular, the frame 64 is connected to the pivot point 66 of the support structure 62. The frame 64 has a generally U-shaped construction. The frame 64 has a first arm 68 that is pivotally connected to one side of the support structure 62 and a second arm 70 that is pivotally connected to another side of the support structure 62. A cross bar 72 extends across the opposite ends of the arms 68 and 70 so as to provide structural stability to the frame 64. The cross bar 72 will extend across the frame 64 at an end opposite to that of the pivotal connection with the support structure 62.

An actuator 74 is connected to the frame 64 so as to move the frame 64 between a retracted position and an extended position (as illustrated in FIG. 2). The actuator 74 is illustrated in the form of a hydraulic piston-and-cylinder assembly. One end of the actuator 74 is connected to the support structure 62 (or to the bed of the truck 54). The opposite end, namely the piston rod 76 has a an end connected to the scissor-lift assembly which is connected to the frame 64. The scissor-lift assembly is of a type illustrated in FIG. 1.

Importantly, in the present invention, there is a lifting bar 78 that is pivotally connected to the frame 64. The lifting bar 78 includes a first strut 80, a second strut 82 and a cross member 84 that are configured into a generally U-shaped configuration. The first strut 80 has an end 86 pivotally connected to the first arm 68 in a location between the ends thereof. Similarly, the second strut 82 has an end 88 that is pivotally connected to the second arm 70 in a location between the ends thereof. Struts 80 and 82 are arranged in a generally parallel relationship and are attached at respectively corresponding locations on the arms 68 and 70 of frame 64.

In the present invention, there is a linkage 90 that is pivotally connected to the support structure 62 and has an opposite end connected to the lifting bar 78. The linkage 90 includes a first link 92 and a second link 94. The first link 92 has one end pivotally connected to the support structure 62 and an opposite end pivotally connected to the first strut 80. The second link 94 has one end pivotally connected to the support structure 62 and an opposite end pivotally connected to the second strut 82. It can be seen that the pivotal connection of the linkage 90 with the support structure 62 is at a location that is in a position elevated above the pivotal connection 66 of the frame 64 with the support structure 62. The links 92 and 94 have a fixed length. As will be described hereinafter, it is the relationship between the frame 64, the lifting bar 78 and the linkage 90 that enables the lifting apparatus 50 of the present invention to have the proper ability to lift the large load 52.

In FIG. 2, it can further be seen that the support structure 62 includes a beam 94 that is affixed so as to extend a portion of the length of the bed of the truck 54. A flange 96 is affixed to the beam 94 and extends upwardly therefrom. The frame 64 is pivotally connected to the beam 94. The linkage 90 is pivotally connected to the flange 96.

Figure 3:
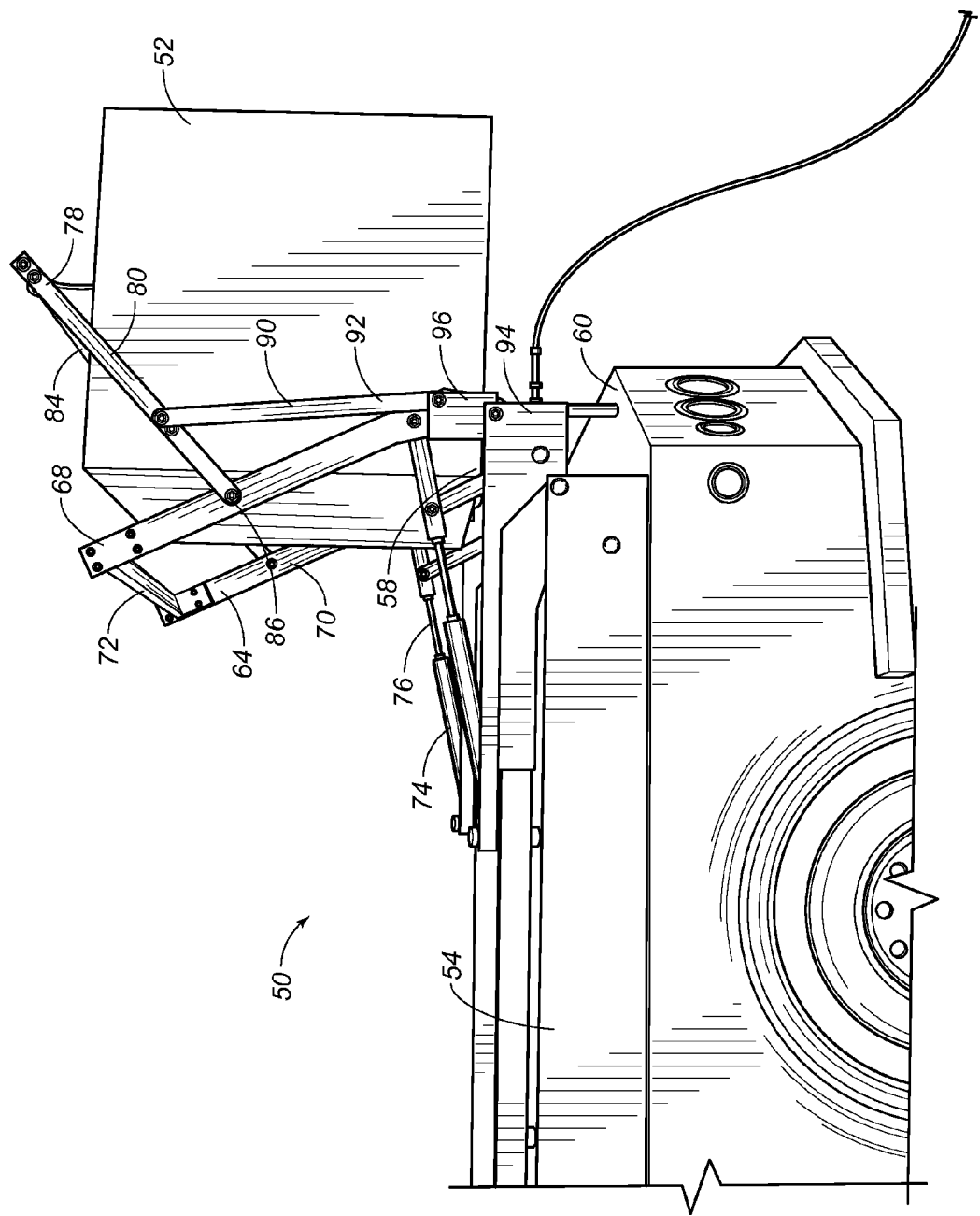
FIG. 3 is a perspective view showing the lifting apparatus of the present invention showing the lifting of the load to an intermediate position.

FIG. 3 illustrates the load 52 as in an elevated position. It can be seen that the bottom edge 58 of the load 52 has effectively cleared the back edge 60 of the bed of the truck 54. In this position, the load 52 is to be delivered into the bed of the truck 54.

In FIG. 3, it can be seen that the actuator 74 has retracted the piston 76 so as to move the frame 64 toward the retracted position from the extended position illustrated in FIG. 2. In this position, the linkage 90 has pivoted about its pivotal connection with the flange 76 so as to extend vertically upwardly. The pivotal connection of the linkage 90 with the lifting bar 78 will cause the lifting bar 78 to pivot about its pivotal connection 86 with the arm 68 of frame 64. In this configuration, the cross member 84 is secured to the connectors 56 of the load 52 so as to allow this upward elevation to occur. There is sufficient clearance between the arms 68 and 70 of the frame 64 so as to allow the load 52 to pass therebetween. Similarly, there is sufficient distance between the struts 80 and 82 of the lifting bar 78 so as to allow the load 52 to pass therebetween. Importantly, since the linkage 90 has a fixed length, this distance in angular orientation of movement is constantly achieved. There is no need for lines or winches to be connected to the cross member 84. Since there are a pair of connectors 56 that join with the cross member 84, the load 52 will only swing forwardly and rearwardly. It will not swing side-to-side, as would be the case if lines or winches were used. As such, the proper alignment of the load 52 with the interior of the frame 64 and the interior of the lifting bar 78 is assured.

It should be noted that the cross member 84 can have ends that join with the struts 80 and 82. These ends can be slightly tapered so as to enlarge in diameter toward the respective struts 80 and 82. As such, the connectors 56 can move to a more centered position along the length of the cross member 84.

Figure 4:
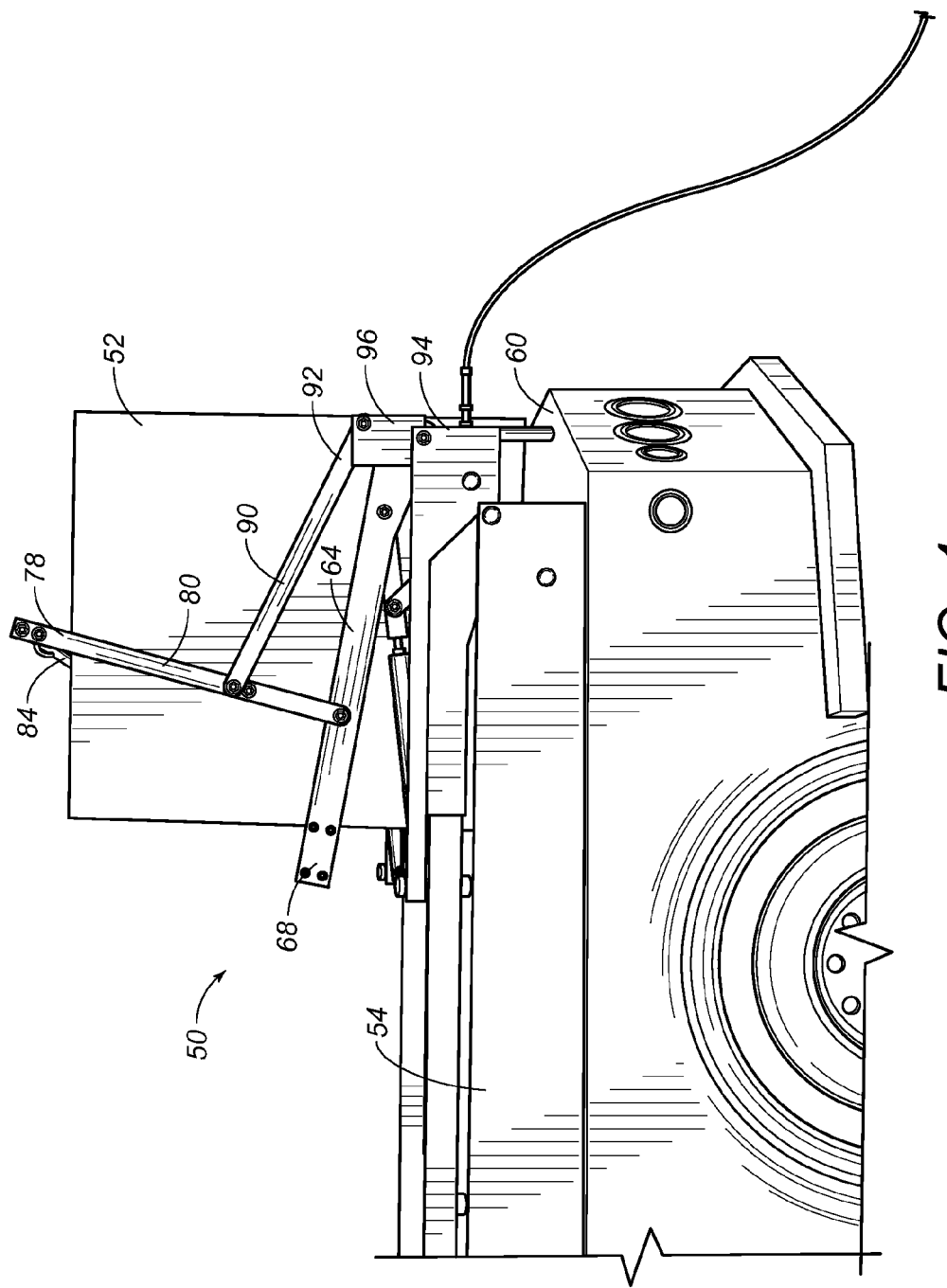
FIG. 4 is a perspective view showing the lifting apparatus of the present invention showing the load being positioned onto a bed of a truck.

FIG. 4 shows the retracted position of the lifting apparatus 50 of the present invention. In this configuration, the actuator 74 has fully retracted so that the piston 76 is positioned completely therein. As such, the frame 64 is pulled backwardly so as to that it resides adjacent to the bed of the truck 54. Similarly, the lifting bar 78 is illustrated in its uppermost position. The first link 92 of the linkage 90 is illustrated as extending from the flange 96 toward the strut 80 of the lifting bar 78. It can be seen that, in this position, the load 52 has effectively cleared the rear end 60 of the bed of the truck 54. The load 52 is now in a position to be deposited upon the bed of the truck 54. As the frame 64 is further retracted, the load 52 will move downwardly toward the bed of the truck 54. Further movement will cause the cross member 84 to be released from the connectors 56 of the load 52. As such, the load 52 is now in a position for being returned to a desired location.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A lifting apparatus comprising:
   a support structure;
   a frame pivotally connected to said support structure, said frame comprising:
      a first arm pivotally affixed at one end to said support structure;
      a second arm pivotally affixed at one end to said support structure; and
      a cross bar extending between said first and second arms adjacent respective opposite ends of said first and second arms;
   an actuating means connected to said frame for moving said frame between a retracted position and an extended position;
   a lifting bar assembly pivotally connected to said frame, said lifting bar assembly comprising:
      a first strut having one end pivotally affixed to said first arm at a location between the ends of said first arm;
      a second strut having one end pivotally affixed to said second arm at a location between the ends of said second arm; and
      a cross member affixed adjacent opposite ends of said first and second struts and extending therebetween; and
   a linkage having one end pivotally connected to said support structure and an opposite end connected to at least one of said first and second struts in a location between the ends of the strut.

2. The lifting apparatus of claim 1, said support structure comprising:
   a beam; and
   a flange affixed to said beam and extending upwardly therefrom, said frame pivotally connected to said beam, said linkage pivotally connected to said flange.

3. The lifting apparatus of claim 2, further comprising:
   a truck bed having said beam affixed thereto.

4. The lifting apparatus of claim 1, said first strut and said second strut and said cross member defining a generally U-shaped configuration.

5. The lifting apparatus of claim 1, said linkage comprising:
   a first link having one end pivotally affixed to said support structure and an opposite end pivotally affixed to said first strut in a position between the ends thereof; and
   a second link having one end pivotally affixed to said support structure and an opposite end pivotally affixed to said second strut in a position between the ends thereof.

6. The lifting apparatus of claim 5, each of said first and second links having a fixed length.

7. The lifting apparatus of claim 1, said actuating means comprising a hydraulic piston-and-cylinder assembly.

8. The lifting apparatus of claim 1, said pivotal connection of said linkage with said support structure being elevated above the pivotal connection of said frame with said support structure.

9. A lifting apparatus comprising:
   a vehicle having a bed;
   a support structure positioned on said bed of said vehicle;
   a frame pivotally connected to said support structure, said frame comprising:
      a first arm pivotally affixed at one end to said support structure;
      a second arm pivotally affixed at one end to said support structure; and
      a cross bar extending between said first and second arms adjacent respective opposite ends of said first and second arms;

an actuating means connected to said frame for moving said frame between a retracted position and an extended position;

a lifting bar assembly pivotally connected to said frame, said lifting bar assembly comprising:
  a first strut having one end pivotally affixed to said first arm at a location between the ends of said first arm;
  a second strut having one end pivotally affixed to said second arm at a location between the ends of said second arm; and
  a cross member affixed adjacent opposite ends of said first and second struts and extending therebetween; and a linkage having one end pivotally connected to said support structure and an opposite end connected to at least one of said first and second struts in a location between the ends of the strut.

10. The lifting apparatus of claim 9, said support structure comprising:
  a beam; and
  a flange affixed to said beam and extending upwardly therefrom, said frame pivotally connected to said beam, said linkage pivotally connected to said flange.

11. The lifting apparatus of claim 9, said linkage comprising:
  a first link having one end pivotally affixed to said support structure and an opposite end pivotally affixed to said first strut at a position between the ends thereof; and
  a second link having one end pivotally affixed to said support structure and an opposite end pivotally affixed to said second strut in a position between the ends thereof.

12. The lifting apparatus of claim 11, each of said first and second links having a fixed length.

13. The lifting apparatus of claim 9, said actuating means comprising a hydraulic piston-and-cylinder.

14. The lifting apparatus of claim 9, the pivotal connection of said linkage with said support structure being elevated above a position of the pivotal connection of said frame with said support structure.

* * * * *